United States Patent
Orun et al.

(10) Patent No.: US 10,733,212 B2
(45) Date of Patent: Aug. 4, 2020

(54) ENTITY IDENTIFIER CLUSTERING BASED ON CONTEXT SCORES

(71) Applicant: salesforce.com, inc., San Francisco, CA (US)

(72) Inventors: Mehmet Gokmen Orun, San Francisco, CA (US); David Angulo, Boulder, CO (US)

(73) Assignee: salesforce.com, inc., San Francisco, CA (US)

( * ) Notice: Subject to any disclaimer, the term of this patent is extended or adjusted under 35 U.S.C. 154(b) by 194 days.

(21) Appl. No.: 15/940,448

(22) Filed: Mar. 29, 2018

(65) Prior Publication Data
US 2019/0114354 A1    Apr. 18, 2019

Related U.S. Application Data

(60) Provisional application No. 62/573,058, filed on Oct. 16, 2017.

(51) Int. Cl.
G06F 16/28      (2019.01)
G06F 16/2457   (2019.01)
G06Q 30/00     (2012.01)

(52) U.S. Cl.
CPC ...... *G06F 16/285* (2019.01); *G06F 16/24578* (2019.01); *G06Q 30/01* (2013.01)

(58) Field of Classification Search
CPC .................................................. G06F 16/285
USPC ............................................................ 707/737
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 13/986,251, filed Apr. 16, 2013.

*Primary Examiner* — Syling Yen
(74) *Attorney, Agent, or Firm* — Dergosits & Noah LLP; Todd A. Noah

(57) ABSTRACT

A system receives entity data and other entity data, including an identification element and another identification element submitted by an entity for identifying the entity, and a contact element and another contact element submitted by the entity for contacting the entity, from the entity via a department and another department of an enterprise. The system generates scores for each of the contact element the other contact element, the scores being based on the contexts associated with the departments of the enterprise and the contact elements. The system stores an entity identifier cluster including the entity data. The system stores another entity cluster including the entity data and the other entity data, if a match exists between the contact element and the other contact element. The system outputs data stored by any entity identifier cluster that includes query-identified data, the output data being based on the scores.

17 Claims, 6 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0137760 A1* | 6/2011 | Rudie .................. G06Q 40/02 705/30 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1* | 4/2015 | Jakobson .......... G06Q 30/0269 705/14.66 |
| 2015/0172563 A1 | 6/2015 | Jakobson et al. |

* cited by examiner

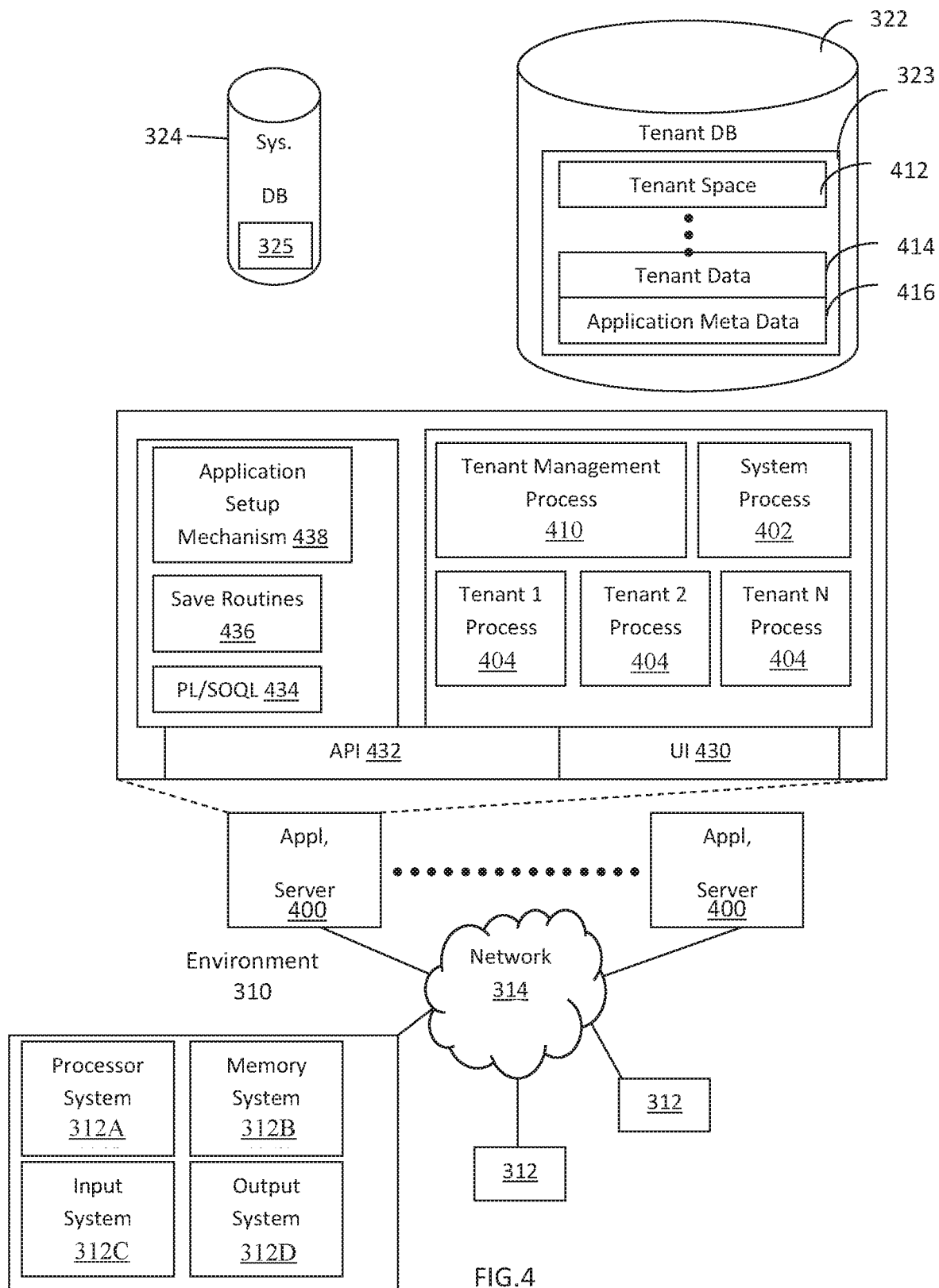

ENTITY IDENTIFIER CLUSTERING BASED
ON CONTEXT SCORES

PRIORITY CLAIM AND RELATED APPLICATIONS

This application claims priority under 35 U.S.C. § 119 or the Paris Convention from U.S. Provisional Patent Application 62/573,058, filed Oct. 16, 2017, the entire contents of which is incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data can become extremely complex and dynamic due to the many changes individual customers go through over time. For example, a company's purchasing agent can change her family name upon marriage, change her email address, change her phone number, and change her employer within a relatively short period of time. In another example, a customer named Robert can also use Rob, Robby, Bob, and Bobby as his name. The use of customer data may create additional challenges, such as due to invalid email addresses, invalid phone numbers, invalid street addresses, names spelled wrong, wrong company information, wrong contact data, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the data from interactions conducted by the company's marketing, sales, and customer service departments, which may be referred to collectively as the company's "funnel." Such a funnel can guide or channel a large number of potential customers participating in marketing interactions to a smaller number of customers participating in sales interactions to an even smaller number of customers participating in customer service interactions.

By the very nature of enterprise application architecture and information lifecycle, data about customer interactions are distributed across different databases and applications. This distribution often leads to a company failing to sufficiently understand the overall customer interactions in support of business activities. A company's marketing department attempts to understand what the best personalized marketing message content and timing are for potential and existing customers, based on a potential customer's marketing response and case history and based on an existing customer's purchase, renewal, and case history. A company's sales department attempts to understand the engagement touch points to optimize a sales process, such as understanding legal agreements including pricing agreements for subsidiary or parent companies, and the discovery and optimization of employee and partner engagement touch points. A company's customer service department may offer call center support staff that attempt to understand customers' orders, payments, shipments, provisioning outcomes, and service levels, regardless of the customer's number of products or services. A traditional approach to resolving these challenges is through the physical instantiation of a master data management hub that stages, profiles, cleanses, enriches, matches, reconciles, and instantiates all customer related account records to create a single golden record, and then provides access to this golden record and its cross references to business applications.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 4 illustrates a block diagram of an embodiment of elements of FIG. 3 and various possible interconnections between these elements.

DETAILED DESCRIPTION

General Overview

Figure 1:
FIG. 1 is an operational flow diagram illustrating a high-level overview of a method for entity identifier clustering based on context scores, in an embodiment.

The traditional master data management hub and its golden records have several challenges. Traditional match rules evaluate a set of related record attributes against another set of record attributes, such as name, email address, phone number, and address, without sufficiently assessing any of the individual identifiers. For example, a traditional master data management hub may treat the results of a match as having equivalent confidence and reliability, even if this match creates a golden record that includes the customer's actual name, the customer's actual email address, an invalid street address, and a phone number that the customer shares with many other potential customers. Additionally, since traditional master data management hubs are typically designed to receive data from only one or two similar data sources, the traditional master data management hubs typically process data without accounting for the context in which the data was generated. For example, a customer data record may list two email addresses for a customer, the first email address having been used for placing five orders and the second email address having been used for placing one order. However, the traditional customer data record would not indicate the relative usage of these email addresses, nor indicate the probable accuracy of any other contact elements.

In accordance with embodiments described herein, there are provided methods and systems for entity identifier clustering based on context scores. A database system receives entity data, including an identification element submitted by an entity for identifying the entity and a contact element submitted by the entity for contacting the entity, from the entity via a department of an enterprise. The database system generates a score for the contact element, the score being based on a context associated with the department of the enterprise and the contact element. The database system stores an entity identifier cluster including the entity data, if no match exists between the contact element and any contact element in any entity identifier cluster. The database system receives other entity data, including another identification element submitted by the entity for identifying the entity and another contact element submitted by the entity for contacting the entity, from the entity via another department of the enterprise. The database system generates another score for the other contact element, the other score being based on another context associated with the other department of the enterprise and the other contact element. The database system stores another entity identifier cluster including the entity data and the other entity data, if a match exists between the contact element and the other contact element. The database system outputs data stored by any entity identifier cluster that includes data identified by a query, the output data being based on the score and the other score.

For example, a customer resolution engine receives the name "Samantha Smith," the Twitter handle "StylishSam," and the email address "sam@mystyle.com" from Acme Corporation's community cloud after Smith registered with Acme's community webpage to search for information about widgets. The customer resolution engine generates a moderate confidence score of 0.6 for the name "Samantha Smith" because 60% of Acme's community webpage users enter their names correctly, a high confidence score of 1.0 for the Twitter handle "StylishSam" because of its use to authenticate Smith, and a moderate confidence score of 0.5 for the email address "sam@mystyle.com" because this unverified email address was entered by an authenticated user. Since Acme's database system has no cluster of nodes that store either the Twitter handle "StylishSam," or the email address "sam@mystyle.com," the customer resolution engine creates a cluster to store Smith's community cloud data. The customer resolution engine receives the name "Samantha Smith" and the email address "sam@mystyle.com" from Acme's marketing cloud after Smith registers for a discount coupon to purchase widgets. The customer resolution engine generates a moderate confidence score of 0.7 for the name "Samantha Smith" because 70% of Acme's marketing webpage users enter their names correctly, and a high confidence score of 1.0 for the email address "sam@mystyle.com" because this email address was verified. Since the cluster storing Smith's community cloud data stores the email address "sam@mystyle.com" that was just received from the marketing cloud, the customer resolution engine uses the marketing cloud data to update the cluster storing Smith's community cloud data.

Continuing the example, the customer resolution engine receives the misspelled name "Samanta Smith," the email address "ssmith@gmail.com," and the phone number "+44 800-7253-3333" from Acme's commerce cloud after Smith used the discount coupon to purchase widgets. The customer resolution engine generates a moderate confidence score of 0.5 for the name "Samanta Smith" because of the misspelling, a high confidence score of 1.0 for the email address "ssmaith@gmail.com" because of its use to place an order, and a moderate confidence score of 0.5 for the phone number "+44 800-7253-3333" because this unverified phone number was entered by a user who placed an order. Since no cluster stores either the email address "ssmith@gmail.com," or the phone number "+44 800-7253-3333," the customer resolution engine creates a cluster to store Smith's commerce cloud data. An Acme customer service representative receives the name "Sam Smith" the Twitter handle "StylishSam," the phone number "+00 800-7253-3333," and the email address "ssmith@gmail.com" from Acme's service cloud when Smith requests technical assistance in using her widgets, so the representative queries the database for Smith's data. The customer resolution engine generates a moderate confidence score of 0.8 for the name "Sam Smith" because 80% of Acme's service webpage users enter their names correctly, a high confidence score of 1.0 for the email address "ssmaith@gmail.com" because of its use to request assistance, a moderate confidence score of 0.5 for the Twitter handle "StylishSam" because this unverified contact data element was entered by a user requesting assistance, and a low confidence score of 0.3 for the phone number "+00 800-7253-3333" because this unverified phone number was entered by a user who placed an order, and is missing country code digits. Since the cluster storing Smith's marketing and community cloud data stores the Twitter handle "StylishSam" just received by the service cloud, and the cluster storing Smith's commerce clod data stores the email address "ssmith@gmail.com" just received by the service cloud, the customer resolution engine combines Smith's service, commerce, marketing, and community cloud data in one cluster. The database system outputs Smith's combined data to the representative, with the exception of the phone number "+00 800-7253-3333" that has a confidence score that is less than the output threshold, even though Smith had provided the names "Samantha," "Samanta," and "Sam" that do not match.

Systems and methods are provided for entity identifier clustering based on context scores. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for entity identifier clustering based on context scores will be described with reference to example embodiments. The following detailed description will first describe a method for entity identifier clustering based on context scores.

While one or more implementations and techniques are described with reference to an embodiment in which entity identifier clustering based on context scores is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 is an operational flow diagram illustrating a high-level overview of a method 100 for entity identifier clustering based on context scores. Entity data is received from an entity via a department of an enterprise, the entity data including an identification element submitted by the entity for identifying the entity, and also including a contact element submitted by the entity for contacting the entity, block 102. The database system receives entity data that may be clustered. For example, and without limitation, this can include a customer resolution engine receiving the name "Samantha Smith," the Twitter handle "StylishSam," and the email address "sam@mystyle.com" from Acme Corporation's community cloud after Smith registered with Acme's community webpage and searched Acme's community database for information about widgets. An entity can be a thing with distinct and independent existence, such as a customer, a consumer, an individual, and/or an enterprise. Entity data can be information associated with a thing with distinct and independent existence, such as a customer, a consumer, an individual, and/or an enterprise. An enterprise can be a business, a company, and/or an organization. A department can be a division of an organization such as a government, a university, a business, a company, or a shop, dealing with a specific subject, commodity, or area of activity. An identification element can be information that indicates who or what someone or something is. A contact element can be information that enables communication with someone or something.

The customer resolution engine can cleanse, normalize, and enrich entity data as needed. For example, a traditional match rule for uniquely identifying a person may process the data set that includes "John Smith/1 Main St, San Francisco, Calif. 94105" and "John Smith/11 Main St, San Francisco, Calif. 94105," and identify two unique people. While a traditional match rule can match addresses by using "fuzzy" strings, in isolation this fuzzy matching can lead to false positives, as there could be two different John Smiths at different addresses. In contrast, the customer resolution engine can more intelligently apply matching rules by incorporating identifier reliability into the matching process. For this example, the customer resolution engine captures and leverages data validation and enrichment attributes as part of the identifier attributes to determine that "11 Main St" is not a valid street address for "San Francisco, Calif. 94105," infer a data entry error in the street number, and then identify the nearest string or geo-proximity match as a reliable candidate, thereby identifying only one unique John Smith on Main Street in San Francisco.

The customer resolution engine can use a similar approach in assessing reliability of an identifying attribute for uniqueness. For example, a traditional match rule "Name AND (Phone Number OR Email)" would process the data set that includes "John Smith/415-555-1212/john.smith@gmail.com," "John Smith/415-555-1212/john_smith@gmail.com," and "Cary Jones/415-555-1212/cary@joneses.com," and then identify two unique people, John Smith and Cary Jones. In contrast, the customer resolution engine can more intelligently apply matching rules by identifying how many unique source records, names, and email addresses relate to any given phone number, or vice versa. By identifying that a specific phone number is commonly used across many records, where other match condition attributes did not match, such as name and email address, the customer resolution engine can apply a matching rule that processes the specific phone number as a shared identifier, which is not a unique identifier, thereby identifying two unique John Smiths who share the phone number 415-555-1212.

After receiving a contact element via a department of an enterprise, a score is generated for the contact element, the score being based on a context associated with the department of the enterprise and the contact element, block 104. The database system generates context scores for contact elements. For example, the customer resolution engine generates a moderate confidence score of 0.6 for the name "Samantha Smith" because 60% of Acme's community webpage users enter their names correctly, a high confidence score of 1.0 for the Twitter handle "StylishSam" because of its use to authenticate Smith, and a moderate confidence score of 0.5 for the email address "sam@mystyle.com" because this unverified email address was entered by an authenticated user. Although this example describes a context score that ranges from a minimum of 0.0 to a maximum of 1.0, any range and any type of context score may be used. Continuing this example, when Smith opens the welcome email sent to the email address "sam@mystyle.com," the customer resolution engine generates an updated confidence score of 0.8 for the email address "sam@mystyle.com" because this now verified email address remains the secondary contact point due to the primacy given by Smith to her Twitter handle. The database system can generate scores based on rules that can be adjusted over time, or through applied machine learning of detecting patterns that can make categorical recommendations on reliability and relevance. The rules can be deterministic rules, as specified by a data steward or system administrator, or probabilistic rules based on the likelihood and patterns as informed by the types of scores. The specific rule used in any system operation is driven by configuration and the context for the data element to be operated upon. Information such as tenant, source system, associated data elements, etc., provide the rules context. A score can be a rating or grade. A context can be the circumstances that form the setting for an event, and in terms of which the event may be understood and assessed.

Having received and scored entity data that includes a contact element, an entity identifier cluster that includes the entity data is stored, in response to determination that no match exists between the contact element and any contact element associated with any entity identifier cluster, block 106. The database system stores a cluster of entity data. By way of example and without limitation, this can include the customer resolution engine checking the customer database and determining that no entity identifier cluster's contact element matches either the Twitter handle "StylishSam" or the email address "sam@mystyle.com" that were received from Smith via Acme's community cloud. Instead of attempting to match the name "Samantha Smith" with any of the numerous entity identifier clusters' identification elements for customers with the family name Smith, the customer resolution engine stores Smith's data as new customer data elements in a cluster of graph nodes that are connected by edges. If the customer resolution engine had determined that any entity identifier cluster's contact element matches any of the newly received entity data's contact elements, then the customer resolution engine would use the newly received entity data to update the matching entity identifier cluster, similar to the processes described below in reference to blocks 112 and 124.

Figure 2:
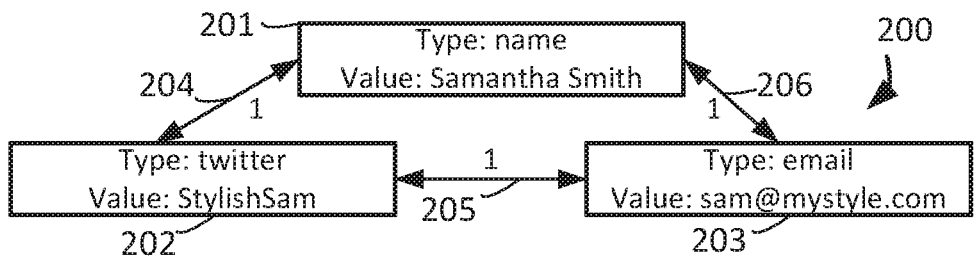
FIGS. 2 A-H illustrate example data structures used for entity identifier clustering based on context scores, in an embodiment.
Figure 2:
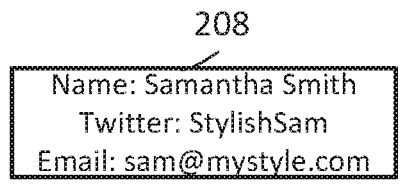
Figure 2:
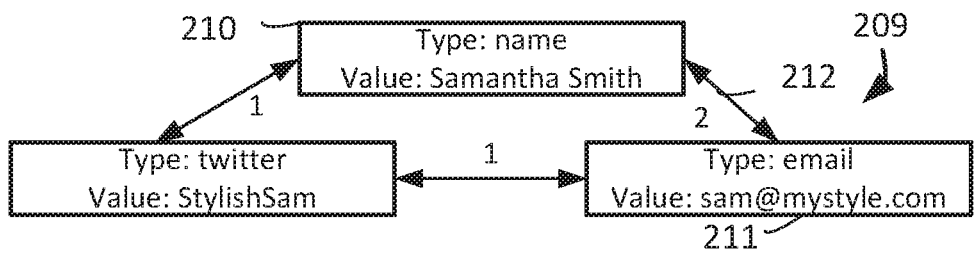
Figure 2:
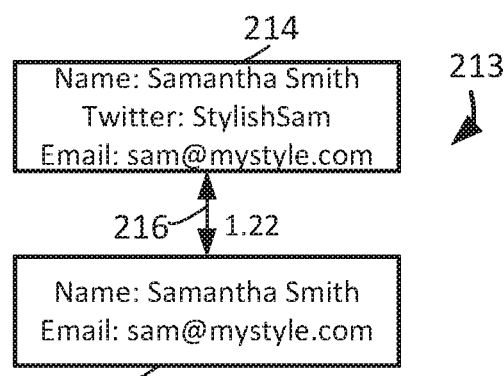

FIG. 2A depicts an example entity identifier cluster that represents Smith's community cloud data. The entity identifier cluster may include a first node representing a contact element, a second node representing an identification element, and a first edge connecting the first node to the second node, the first edge representing a number of instances that the contact element is associated with the identification element. For example, the entity identifier cluster 200 includes the name type node 201 that represents the value "Samantha Smith," the Twitter type node 202 that represents the value "StylishSam," and the email type node 203 that represents the value "sam@mystyle.com." The weight of 1 for each of the edges 204, 205, and 206 represents the number of instances that the corresponding customer data elements 201, 202, and 203 are associated with each other. The entity identifier cluster 200 can be represented by the customer data record 207 that is depicted by FIG. 2B. The customer data record 207 includes the record node 208 that stores the name "Samantha Smith," the Twitter handle "StylishSam," and the email address "sam@mystyle.com."

Identity resolution can use a graph data structure, which may be referred to as an identity graph, in which nodes represent identifiers, such as identification elements and contact elements, and edges represent relationships between the identifiers. Then clustering analysis can be run on the identity graph to discover clusters of nodes which can be grouped together as an entity identifier cluster, which identifies an entity, such as a person or a company that is a customer. These nodes can further be refined and analyzed to distill a profile or a record, which may be referred to as an entity 360 view, that can then be used for a number of business use cases. Any identifier may be shared by multiple entities. However, sharing, in general, is constrained to fairly tight social groups, such as a household, a company, roommates, etc. Since the main use case is to connect an identifier to a small number of profiles, any identifier that has a high number of edges may be handled differently, such as by being removed from the identity graph. Consequently, the identity graph is a collection of many smaller connected components.

The identity graph may be an undirected, weighted, and colored graph data structure. The identity graph may be "undirected" because there is no directionality of the edges that represent relationships. All that is known is that identifier A is connected to identifier B, such as the name "Samantha Smith" is connected to the Twitter handle "StylishSam." The identity graph may be "weighted" because some relationships between identifiers are stronger than other relationships between identifiers. For example, if the same email address and the same phone number are connected together by data from multiple sources, instead of adding multiple edges, the weight of the edge connecting the phone number and the email address is incremented. This weighting provides useful meta data for clustering algorithms. The identity graph may be "colored" because not all edges are the same, as different edges may represent different types of relationships. For example, one edge may represent a business relationship, such as an edge that connects a customer's name to the customer's business email address, and another edge may represent a personal relationship, such as an edge that connects the customer's name to the customer's personal email address. Colored edges represent useful metadata for clustering and for constructing profiles. The profile may be based on context scores, such as an edge connecting two record nodes and representing a combination of the two context scores for two data elements that match between the two record nodes.

An entity identifier cluster can be a grouping of information associated with a thing that has distinct and independent existence, such as a customer, a consumer, an individual, and/or an enterprise. A match can be a correspondence or similarity between a pair of things. A cluster can be a group of similar things positioned or occurring closely together. A node can be a point at which lines or pathways intersect or branch; a central or connecting point. An edge can be a line extending from one node to another node. A number can be an arithmetical value, expressed by a word, symbol, or figure, representing a particular quantity and used in counting and making calculations. An instance can be an example or single occurrence of something.

Continuing this example, Acme's marketing cloud responds to Smith's search by sending a discount coupon for purchasing widgets to the email address "sam@mystyle.com." After receiving entity data from an entity via a department of an enterprise, other entity data is received from the entity via another department of the enterprise, the other entity data including another identification element submitted by the entity for identifying the entity, and also including another contact element submitted by the entity for contacting the entity, the other department of the enterprise being different from the department of the enterprise, block 108. The database system receives other entity data that may be clustered. In embodiments, this can include the customer resolution engine receiving the name "Samantha Smith" and the email address "sam@mystyle.com" from Acme's marketing cloud after Smith registers to use the discount coupon for purchasing widgets.

After receiving another contact element via another department of the enterprise, another score is generated for the other contact element, the other score being based on another context associated with the other department of the enterprise and the other contact element, block 110. The database system generates a context score for any other contact elements. For example, the customer resolution engine generates a moderate confidence score of 0.7 for the name "Samantha Smith" because 70% of Acme's marketing webpage users enter their names correctly, and a high confidence score of 1.0 for the email address "sam@mystyle.com" because this email address was verified.

Having received multiple instances of entity data that include contact elements, an entity identifier cluster is stored that includes the entity data and the other entity data, in response to a determination that a match exists between the contact element and the other contact element, block 112. The database system uses the newly received entity data to update an existing entity identifier cluster. For example, and without limitation, this can include the customer resolution engine checking the customer database to determine that the previously stored entity identifier cluster for Smith's community cloud data has a contact element that matches the email address "sam@mystyle.com" that was just received from the marketing cloud. Therefore, instead of storing a new entity identifier cluster for Smith's data from the marketing cloud, the customer resolution engine stores an updated entity identifier cluster by updating the entity identifier cluster for Smith's community cloud data, as depicted by FIG. 2C. If the customer resolution engine had determined that no entity identifier cluster's contact element matches any of the newly received entity data's contact element, then the customer resolution engine would store the newly received entity data as a new entity identifier cluster, similar to the processes described above in reference to block 106 and below in reference to block 118.

FIG. 2C depicts the entity identifier cluster 209 that includes the name type node 210, which represents the value "Samantha Smith," and the email type node 211, which represents the value "sam@mystyle.com." The weight of 2 for the edge 212 represents the number of instances that the corresponding values "Samantha Smith," and "sam@mystyle.com" for the corresponding nodes 210 and 211 are associated with each other.

The entity identifier cluster 209 can be represented by the customer data record 213 that is depicted by FIG. 2D. A node may represent the entity data, and an edge, which connects the node to another node representing the other entity data, may represent a number of instances that any data element represented by the node is associated with any other data element represented by the other node, with each of the number of instances being based on corresponding context scores. For example, the customer data record 213 includes the record node 214, which is substantially similar to the record node 208 depicted in FIG. 2B, and the record node 215 that stores the name "Samantha Smith" and the email address "sam@mystyle.com." The weight of 1.22 for the edge 216 represents the number of instances that the corresponding values "Samantha Smith," and "sam@mystyle.com" for the corresponding nodes 214 and 215 are associated with each other, with each of the number of instances being based on corresponding context scores. Since the record node 214 stores the name "Samantha Smith" with its context score of 0.6 and its context of Acme's community webpage, and the record node 215 stores the name "Samantha Smith" with its context score of 0.7 and its context of Acme's marketing webpage, the customer resolution engine multiplies the name context score of 0.6 by the name context score of 0.7 to produce a weight of 0.42 representing the instance of the matching names between the record nodes 214 and 215. Since the record node 214 stores the email address "sam@mystyle.com" with its context score of 0.8 and its context of a verified secondary email address, and the record node 215 stores the email address "sam@mystyle.com" with its context score of 1.0 and its context of a verified primary email address, the customer resolution engine multiplies the email context score of 0.8 by the email context score of 1.0 to produce a weight of 0.80 representing the instance of the matching email addresses between the record nodes 214 and 215. Then the customer resolution engine adds the name weight of 0.42 to the email address weight of 0.80 to create the combined weight of 1.22 for the edge 216 that connects the record nodes 214 and 215. The record nodes 214 and 215 persist their contexts so that the customer resolution engine can track and manage these contexts for use and analysis. Although this example describes the customer resolution engine multiplying context scores for each matching instance between nodes, and then adding the resulting products to determine the weight of the edge between the nodes, the customer resolution engine can use any method to combine context scores for each matching instance.

Continuing the example, Smith uses the discount coupon for purchasing widgets. After receiving entity data from an entity via a department of an enterprise, additional entity data is optionally received from the entity via an additional department of the enterprise, the additional entity data including an additional identification element submitted by the entity for identifying the entity, and also including an additional contact element submitted by the entity for contacting the entity, the additional department of the enterprise being different from each of the department of the enterprise and the other department of the enterprise, block 114. The database system receives additional entity data that may be clustered. By way of example and without limitation, this can include the customer resolution engine receiving the name "Samanta Smith," the email address "ssmith@gmail.com," and the phone number "+44 800-7253-3333" from Acme's commerce cloud after Smith used the discount coupon to purchase widgets.

After receiving an additional contact element via an additional department of the enterprise, an additional score is optionally generated for the additional contact element, the additional score being based on an additional context associated with the additional department of the enterprise and the additional contact element, block 116. The database system can generate additional context scores for additional contact elements. For example, the customer resolution engine generates a moderate confidence score of 0.5 for the name "Samanta Smith" because of the misspelling, a high confidence score of 1.0 for the email address "ssmaith@gmail.com" because of its use to place an order, and a moderate confidence score of 0.5 for the phone number "+44 800-7253-3333" because this unverified phone number was entered by a user who placed an order.

Having received Smith's data from Acme's commerce cloud, the customer resolution engine checks the customer database and determines that no entity identifier cluster's contact element matches either the email address "ssmith@gmail.com," or the phone number "+44 800-7253-3333." Having received additional entity data that includes an additional contact element, an entity identifier cluster that includes the additional contact element is optionally stored, in response to a determination that no match exists between the additional contact element and any contact element associated with any entity identifier cluster, block 118. The database system can store additional entity data in a cluster. In embodiments, this can include the customer resolution engine storing the new customer data elements for Smith's commerce cloud data as the entity identifier cluster 217 depicted in FIG. 2E, but which is not clustered with the previous entity identifier cluster 218 for Smith's community and marketing cloud data, which is substantially similar to the entity identifier cluster 209 depicted by FIG. 2C. The customer resolution engine does not attempt to match the name "Samanta Smith" with any of the numerous entity identifier clusters' identification elements for customers with the family name Smith. If the customer resolution engine had determined that an entity identifier cluster's contact element matches any of the newly received entity data's contact elements, then the customer resolution engine would use the newly received entity data to update the matching entity identifier cluster, similar to the processes described above in reference to block 112 and below in reference to block 124.

Figure 2E:
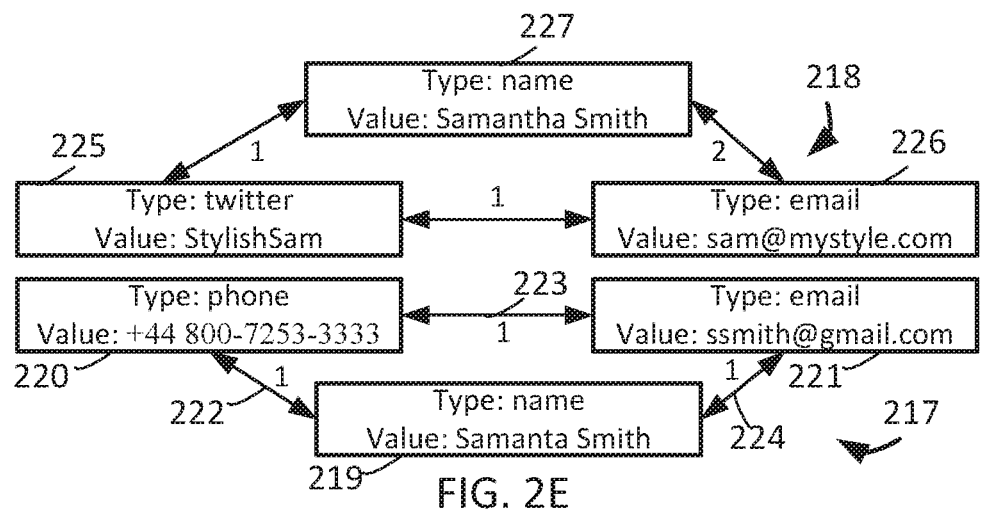

FIG. 2E depicts the entity identifier cluster 217 that includes the name type node 219 which represents the value "Samanta Smith," the phone type node 220 which represents the value "+44 800-7253-3333," and the email type node 221 which represents the value "ssmith@gmail.com." The weight of 1 for each of the edges 222, 223, and 224 represents the number of instances that the corresponding customer data elements 219, 220, and 221 are associated with each other. Even if the cluster resolution engine had attempted to match the name "Samanta Smith" with the customer data previously stored for "Samantha Smith," the match may not have occurred because the customer data from the commerce cloud misspells the name "Samantha" as "Samanta" and because the customer database may store records for multiple people named "Samantha Smith." The entity identifier cluster 217 is separate from the entity identifier cluster 218 because neither the phone type node 220 which represents the value "+44 800-7253-3333," nor the email type node 221 which represents the value "ssmith@gmail.com," matches either the Twitter type node 225, which represents the value "StylishSam," or the email type node 226, which represents the value "sam@mystyle.com," in the entity identifier cluster 218. Therefore, the entity identifier clusters 217 and 218 are separate clusters despite the similarities in their respective values "Samantha Smith" and "Samantha Smith" in their respective name type nodes 219 and 227.

Figure 2F:
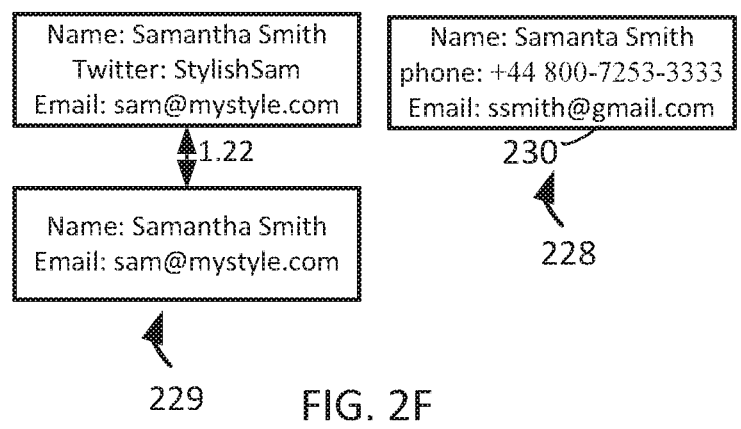

The entity identifier clusters 217 and 218 can be represented by the customer data records 228 and 229, respectively, that are depicted by FIG. 2F. The customer data record 228 includes the record node 230 that stores the name "Samanta Smith," the phone number ""+44 800-7253-3333," and the email address "ssmith@gmail.com." The customer data record 229 is substantially similar to the customer data record 213 depicted by FIG. 2D.

Continuing the example, Smith contacts an Acme customer service representative to request technical assistance in using the widgets that she purchased After receiving entity data from an entity via a department of an enterprise, further entity data is optionally received from the entity via a further department of the enterprise, the further entity data including a further identification element submitted by the entity for identifying the entity, and also including a further contact element submitted by the entity for contacting the entity, the further department of the enterprise being different from each of the department of the enterprise, the other department of the enterprise, and the additional department of the enterprise, block 120. The database system receives further entity data that may be clustered. For example, the customer resolution engine receives the name "Sam Smith," the email address ssmith@gmail.com, the phone number 00800-7253-3333, and the Twitter handle "StylishSam" from Acme's service cloud after Smith requested technical assistance in using her widgets.

After receiving a further contact element via a further department of the enterprise, a further score is optionally generated for the further contact element, the further score being based on a further context associated with the further department of the enterprise and the further contact element, block 122. The database system can generate further context scores for further contact elements. For example, the customer resolution engine generates a moderate confidence score of 0.8 for the name "Sam Smith" because 80% of Acme's service webpage users enter their names correctly, a high confidence score of 1.0 for the email address "ssmaith@gmail.com" because of its use to request assistance, a moderate confidence score of 0.5 for the Twitter handle "StylishSam" because this unverified contact data element was entered by a user requesting assistance, and a low confidence score of 0.3 for the phone number "+00 800-7253-3333" because this unverified phone number was entered by a user who placed an order, and is missing country code digits. After the customer service cloud sends an assistance email to the email address "ssmith@gmail.com" and receives a failed email delivery message in return, the customer resolution engine generates an updated confidence score of 0.0 for the service cloud's email address "ssmith@gmail.com" because of the failed email delivery.

Having received further entity data that include a further contact element, an entity identifier cluster including the further entity data and at least one of entity data, other entity data, and additional entity data is optionally stored, in response to a determination that a match exists between the further contact element and one of a contact element, another contact element, and an additional contact element, block 124. The database system can store further entity data in a cluster. In embodiments, this can include the customer resolution engine checking the customer database to determine that the entity identifier cluster for Smith's community and marketing cloud data has a contact element that matches the email address "sam@mystyle.com" that was just received from the customer service cloud. The customer resolution engine also checks the customer database and determines that the entity identifier cluster for Smith's commerce cloud data has a contact element that matches the phone number "+00 800-7253-3333" that was just received from the customer service cloud, and also has a contact element that matches the email address "ssmith@gmail.com" that was just received from the customer service cloud. The customer data resolution engine can use fuzzy matching to match data elements that are not exact matches, such as a fuzzy match between the phone number "+00 800-7253-3333" and the phone number "+44 800-7253-3333." Therefore, instead of storing a new entity identifier cluster for Smith's data from the customer service cloud, the customer resolution engine stores an updated entity identifier cluster by updating Smith's data elements. If the customer resolution engine had determined that no entity identifier cluster's contact element matches any of the newly received entity data's contact elements, then the customer resolution engine would store the newly received entity data as a new entity identifier cluster, similar to the processes described above in reference to blocks 104 and 112.

Figure 2G:
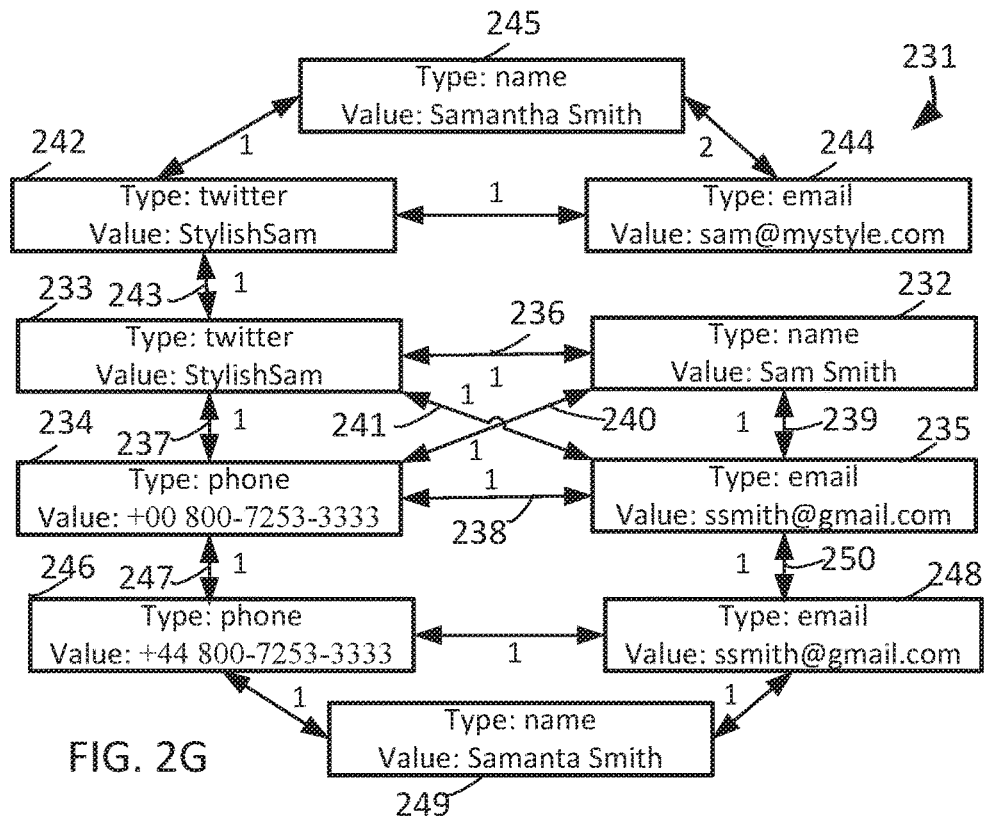

FIG. 2G depicts the entity identifier cluster 231 that includes the name type node 232 which represents the value "Sam Smith," the Twitter type node 233 which represents the value "StylishSam," the phone type node 234 which represents the value "+00 800-7253-3333," and the email type node 235 which represents the value "ssmith@gmail.com." The weight of 1 for each of the edges 236, 237, 238, 239, 240, and 241 represents the number of instances that the corresponding customer data elements 232, 233, 234, and 235 are associated with each other.

Since the Twitter type node 233, which represents the value "StylishSam," matches the Twitter type node 242, which represents the value "StylishSam," then the edge 243 connects the Twitter type node 233 to the Twitter type node 242. The edge 243 represents the number of instances that the value represented by the node 233 is associated with the value represented by the node 242. The edge 243 also connects the customer data elements 232, 233, 234, and 235 to the customer data elements 242, 244, and 245, which are substantially similar to the customer data elements 225, 226, and 227 in the entity identifier cluster 218 depicted in FIG. 2 E.

Similarly, since the phone type node 234, which represents the value "+00 800-7253-3333," fuzzy matches the phone type node 246, which represents the value "+44 800-7253-3333," then the edge 247 connects the phone type node 234 to the phone type node 246. The edge 247 represents the number of instances that the value represented by the node 234 is associated with the value represented by the node 246. The edge 247 also connects the customer data elements 232, 233, 234, and 235 to the customer data elements 246, 248, and 249, which are substantially similar to the customer data elements 220, 221, and 219 in the entity identifier cluster 217 depicted in FIG. 2 E.

Likewise, since the email type node 235, which represents the value "ssmith@gmail.com," matches the email type node 248, which represents the value "ssmith@gmail.com," then the edge 250 connects the email type node 235 to the email type node 248. The edge 250 represents the number of instances that the value represented by the node 235 is associated with the value represented by the node 248. The edge 250 also connects the customer data elements 232, 233, 234, and 235 to the customer data elements 246, 248, and 249, which are substantially similar to the customer data elements 220, 221, and 219 in the entity identifier cluster 217 depicted in FIG. 2 E.

Figure 2H:
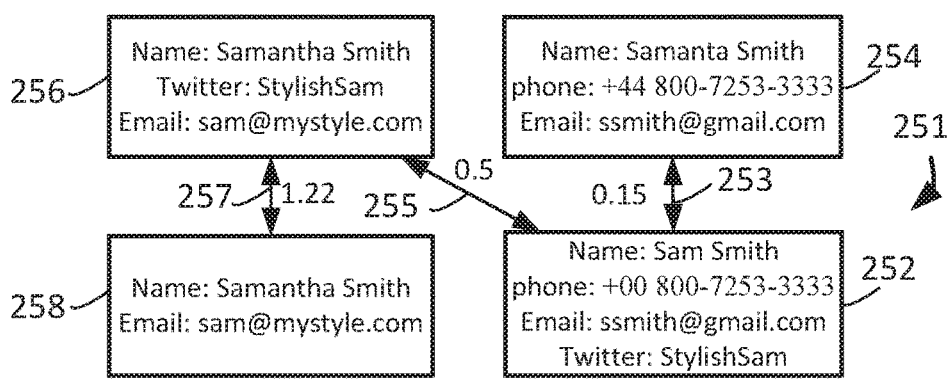

The entity identifier cluster 231 can be represented by the customer data record 251 that is depicted by FIG. 2H. The customer data record 251 includes the record node 252 that stores the name "Sam Smith," the Twitter handle "StylishSam," the phone number "+00 800-7253-3333," and the email address "ssmith@gmail.com." The weight of 0.15 for the edge 253 represents the number of instances that the corresponding values "800-7253-3333," and "ssmith@gmail" for the corresponding nodes 252 and 254 are associated with each other, with each of the number of instances being based on corresponding context scores. Since the record node 252 stores the phone number "+00 800-7253-3333," with its context score of 0.3 and its context of an unverified phone number that is missing country code digits, and the record node 254 stores the phone number "+44 800-7253-3333," with its context score of 0.5 and its context of an unverified phone number, the customer resolution engine multiplies the phone number context score of 0.3 by the phone number context score of 0.5 to produce a weight of 0.15 representing the instance of the matching phone numbers between the record nodes 252 and 254. Since the record node 252 stores the email address "ssmith@gmail.com" with its context score of 0.0 and its context of a failed email delivery message, and the record node 254 stores the email address "ssmith@gmail.com" with its context score of 1.0 and its context of a use to request assistance, the customer resolution engine multiplies the email context score of 0.0 by the email context score of 1.0 to produce a weight of 0.0 representing the instance of the matching email addresses between the record nodes 252 and 254. Then the customer resolution engine adds the phone number weight of 0.15 to the email address weight of 0.0 to create the combined weight of 0.15 for the edge 253 that connects the record nodes 252 and 254. The record nodes 252 and 254 persist their contexts so that the customer resolution engine can track and manage these contexts for use and analysis.

Similarly, the weight of 0.5 for the edge 255 represents the number of instances that the corresponding value "StylishSam" for the corresponding nodes 252 and 256 are associated with each other, with each of the number of instances being based on corresponding context scores. Since the record node 252 stores the Twitter handle "StylishSam" with its context score of 0.5 and its context of an unverified secondary contact entered by a user requesting assistance, and the record node 256 stores the Twitter handle "StylishSam" with its context score of 1.0 and its context of a use to authenticate an Acme community webpage user, the customer resolution engine multiplies the Twitter handle context score of 0.5 by the Twitter handle context score of 1.0 to produce a weight of 0.5 representing the instance of the matching Twitter handles between the record nodes 252 and 255, which results in the weight of 0.5 for the edge 255 that connects the record nodes 252 and 256. In this example, the weight of the edge 255 connecting the record nodes 252 and 256 that include the email address "ssmith@gmail.com" would have initially been 1.5 prior to the failed email delivery sent to this address resulting in the customer resolution engine generating the updated confidence score of 0.0 for the email address "ssmith@gmail.com" in the record node 252. The record nodes 252 and 256 persist their contexts so that the customer resolution engine can track and manage these contexts for use and analysis.

Likewise, the weight of 1.22 for the edge 257 represents the number of instances that the corresponding values "Samantha Smith," and "sam@mystyle.com" for the corresponding nodes 256 and 258 are associated with each other. The calculation of the weight of 1.22 for the edge 257 is described above in reference to the record nodes 214 and 215 and the edge 216, as depicted in FIG. 2D, which are substantially similar to the record nodes 256 and 258 and the edge 257, respectively.

After storing an entity identifier cluster, data stored by any entity identifier cluster that includes query-identified data is output, the output data being based on the score and the other score, block 126. The database system outputs data from entity identifier clusters in response to queries. For example, and without limitation, this can include the customer resolution engine outputting Smith's data, including the name "Samantha Smith," the name "Sam Smith," the name "Samanta Smith," the Twitter handle "StylishSam," the email address "sam@mystyle.com," the email address "ssmith@gmail.com," and the phone number "+44 800-7253-3333" in response to a query from an Acme customer service representative who receives a call from Smith about the functionality of her widgets. In this example, the output data did not include the phone number "+00 800-7253-3333 because the customer resolution engine previously generated a confidence score of 0.3 for this phone number and the database system applies an output threshold of 0.4 for individual data elements. Alternatively, the output data includes the phone number "+00 800-7253-3333" listed with the confidence score of 0.3 and its context of an unverified phone number that is missing country code digits, after outputting all of the other data elements with higher confidence scores. If the database system applied an edge threshold of 0.4 to the customer data record 251, then the output data would exclude the data in the record node 254 because the edge 253 that connects to record node 254 to the rest of the customer data record 251 has a weight of only 0.15, which is below the edge threshold of 0.4. Although the examples describe and depict entity identifier clusters and customer data records that include the email address "ssmith@gmail.com," the customer resolution engine may delete the email address "ssmith@gmail.com" from the corresponding entity identifier clusters and customer data records after assigning the confidence score of 0.0 to the email address "ssmith@gmail.com" for the record node 252." The customer resolution engine may output data in response to fuzzy queries, such as outputting Samantha Smith's entity data cluster in response to a query that specifies the name S. Smith. A query can be a request for information from a database.

The method 100 may be repeated as desired. Although this disclosure describes the blocks 102-126 executing in a particular order, the blocks 102-126 may be executed in a different order. In other implementations, each of the blocks 102-126 may also be executed in combination with other blocks and/or some blocks may be divided into a different set of blocks.

System Overview

Figure 3:
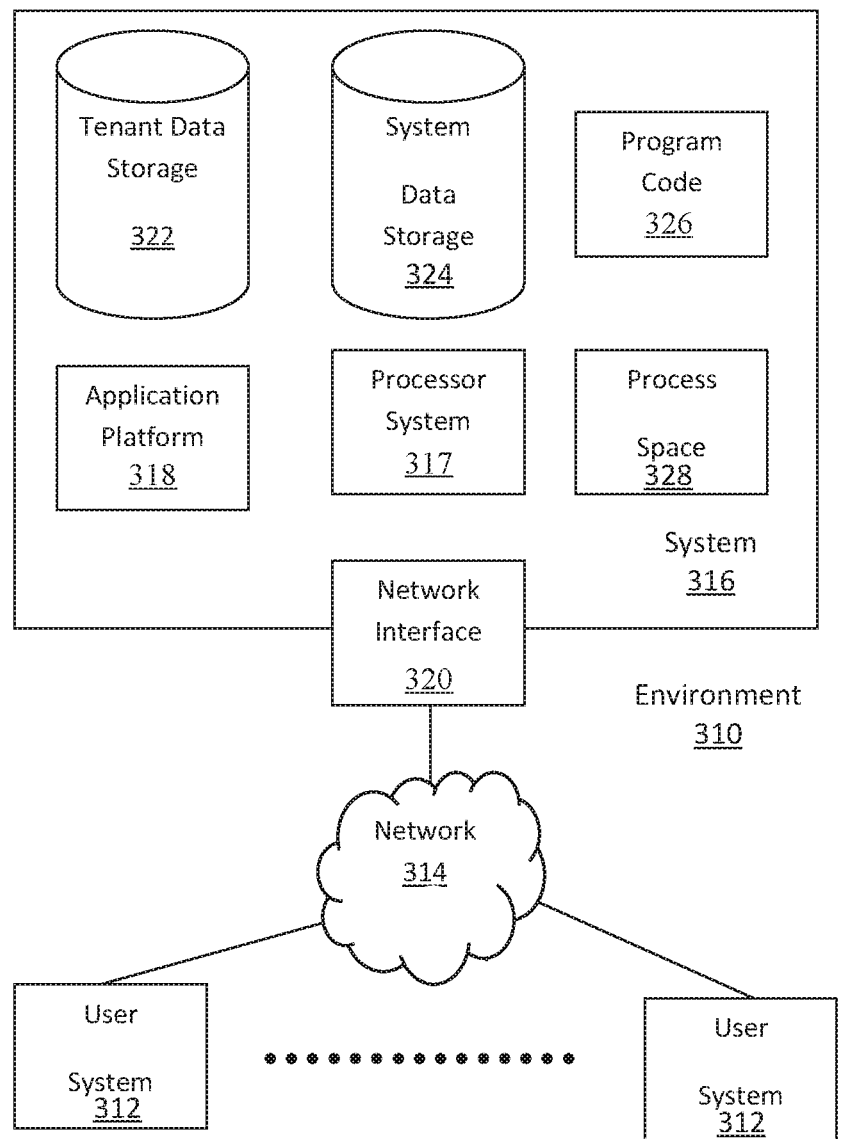
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
receive, by a database system, entity data from an entity via a department of an enterprise, the entity data comprising an identification element submitted by the entity for identifying the entity, and also comprising a contact element submitted by the entity for contacting the entity;
generate, by the database system, a score for the contact element, the score being based on a context associated with the department of the enterprise and the contact element;
store, by the database system, an entity identifier cluster comprising the entity data, in response to a determination that no match exists between the contact element and any contact element associated with any entity identifier cluster;
receive, by the database system, from the entity via another department of the enterprise, other entity data including another identification element for identifying the entity and another contact element for contacting the entity, the other department of the enterprise being different from the department of the enterprise;
generate, by the database system, for the other contact element, another score based on another context associated with the other department of the enterprise and the other contact element;
store, by the database system, another entity identifier cluster comprising the entity data and the other entity data, in response to a determination that a match exists between the contact element and the other contact element;
receive, by the database system, from the entity via an additional department of the enterprise, additional entity data including an additional identification element for identifying the entity and an additional contact element for contacting the entity, the additional department of the enterprise being different from each of the department of the enterprise and the other department of the enterprise;
generate, by the database system, for the additional contact element, an additional score based on an additional context associated with the additional department of the enterprise and the additional contact element; and
output, by the database system, data stored by any entity identifier cluster that includes data identified by a query, the output data being based on the score and the other score.

2. The system of claim 1, the entity identifier cluster comprising a first node storing the contact element, a second node storing the identification element, and a first edge connecting the first node to the second node, the first edge representing a number of instances that the contact element is associated with the identification element, wherein a second edge connects the first node to a third node storing a further contact element, the second edge representing a number of instances that the contact element is associated with the further contact element.

3. The system of claim 1, wherein a node represents the entity data, and an edge, which connects the node to another node representing the other entity data, represents a number of instances that any data element represented by the node is associated with any other data element represented by the other node, each of the number of instances being based on corresponding context scores.

4. The system of claim 1, comprising further instructions, which when executed, cause the one or more processors to store, by the database system, an additional entity identifier cluster comprising the additional entity data, in response to a determination that no match exists between the additional contact element and any contact element associated with any entity identifier cluster.

5. The system of claim 4, comprising further instructions, which when executed, cause the one or more processors to:
receive, by the database system, further entity data from the entity via a further department of the enterprise, the further entity data including a further identification element submitted by the entity for identifying the entity, and also including a further contact element submitted by the entity for contacting the entity, the further department of the enterprise being different from each of the department of the enterprise, the other department of the enterprise, and the additional department of the enterprise; and
generate, by the database system, a further score for the further contact element, the further score being based on a further context associated with the further department of the enterprise and the further contact element.

6. The system of claim 5, comprising further instructions, which when executed, cause the one or more processors to store, by the database system, a further entity identifier cluster comprising the further entity data and at least one of the entity data, the other entity data, and the additional entity data, in response to a determination that a match exists between the further contact element and one of the contact element, the other contact element, and the additional contact element.

7. A computer program product comprising computer-readable program code to be executed by one or more processors when retrieved from a non-transitory computer-readable medium, the program code including instructions to:
receive, by a database system, entity data from an entity via a department of an enterprise, the entity data comprising an identification element submitted by the entity for identifying the entity, and also comprising a contact element submitted by the entity for contacting the entity;
generate, by the database system, a score for the contact element, the score being based on a context associated with the department of the enterprise and the contact element;
store, by the database system, an entity identifier cluster comprising the entity data, in response to a determination that no match exists between the contact element and any contact element associated with any entity identifier cluster;
receive, by the database system, from the entity via another department of the enterprise, other entity data including another identification element for identifying the entity and another contact element for contacting the entity, the other department of the enterprise being different from the department of the enterprise;
generate, by the database system, for the other contact element, another score based on another context associated with the other department of the enterprise and the other contact element;
store, by the database system, another entity identifier cluster comprising the entity data and the other entity data, in response to a determination that a match exists between the contact element and the other contact element;
receive, by the database system, from the entity via an additional department of the enterprise, additional entity data including an additional identification element for identifying the entity and an additional contact element for contacting the entity, the additional department of the enterprise being different from each of the department of the enterprise and the other department of the enterprise;
generate, by the database system, for the additional contact element, an additional score based on an additional context associated with the additional department of the enterprise and the additional contact element; and
output, by the database system, data stored by any entity identifier cluster that includes data identified by a query, the output data being based on the score and the other score.

8. The computer program product of claim 7, the entity identifier cluster comprising a first node storing the contact element, a second node storing the identification element, and a first edge connecting the first node to the second node, the first edge representing a number of instances that the contact element is associated with the identification element, wherein a second edge connects the first node to a third node storing a further contact element, the second edge representing a number of instances that the contact element is associated with the further contact element.

9. The computer program product of claim 7, wherein a node represents the entity data, and an edge, which connects the node to another node representing the other entity data, represents a number of instances that any data element represented by the node is associated with any other data element represented by the other node, each of the number of instances being based on corresponding context scores.

10. The computer program product of claim 7, wherein the program code comprises further instructions to store, by the database system, an additional entity identifier cluster comprising the additional entity data, in response to a determination that no match exists between the additional contact element and any contact element associated with any entity identifier cluster.

11. The computer program product of claim 10, wherein the program code comprises further instructions to:
receive, by the database system, further entity data from the entity via a further department of the enterprise, the further entity data including a further identification element submitted by the entity for identifying the entity, and also including a further contact element submitted by the entity for contacting the entity, the further department of the enterprise being different from each of the department of the enterprise, the other department of the enterprise, and the additional department of the enterprise; and
generate, by the database system, a further score for the further contact element, the further score being based on a further context associated with the further department of the enterprise and the further contact element.

12. The computer program product of claim 11, wherein the program code comprises further instructions to store, by the database system, a further entity identifier cluster comprising the further entity data and at least one of the entity data, the other entity data, and the additional entity data, in response to a determination that a match exists between the further contact element and one of the contact element, the other contact element, and the additional contact element.

13. A method comprising:
receiving, by a database system, entity data from an entity via a department of an enterprise, the entity data comprising an identification element submitted by the entity for identifying the entity, and also comprising a contact element submitted by the entity for contacting the entity;

generating, by the database system, a score for the contact element, the score being based on a context associated with the department of the enterprise and the contact element;

storing, by the database system, an entity identifier cluster comprising the entity data, in response to a determination that no match exists between the contact element and any contact element associated with any entity identifier cluster;

receiving, by the database system, from the entity via another department of the enterprise, other entity data including another identification element for identifying the entity and another contact element for contacting the entity, the other department of the enterprise being different from the department of the enterprise;

generating, by the database system, for the other contact element, another score based on another context associated with the other department of the enterprise and the other contact element;

storing, by the database system, another entity identifier cluster comprising the entity data and the other entity data, in response to a determination that a match exists between the contact element and the other contact element;

receiving, by the database system, from the entity via an additional department of the enterprise, additional entity data including an additional identification element for identifying the entity and an additional contact element for contacting the entity, the additional department of the enterprise being different from each of the department of the enterprise and the other department of the enterprise;

generating, by the database system, for the additional contact element, an additional score based on an additional context associated with the additional department of the enterprise and the additional contact element; and outputting, by the database system, data stored by any entity identifier cluster that includes data identified by a query, the output data being based on the score and the other score.

14. The method of claim 13, the entity identifier cluster comprising a first node storing the contact element, a second node storing the identification element, and a first edge connecting the first node to the second node, the first edge representing a number of instances that the contact element is associated with the identification element, wherein a second edge connects the first node to a third node storing a further contact element, the second edge representing a number of instances that the contact element is associated with the further contact element.

15. The method of claim 13, wherein a node represents the entity data, and an edge, which connects the node to another node representing the other entity data, represents a number of instances that any data element represented by the node is associated with any other data element represented by the other node, each of the number of instances being based on corresponding context scores.

16. The method of claim 13, the method further comprising storing, by the database system, an additional entity identifier cluster comprising the additional entity data, in response to a determination that no match exists between the additional contact element and any contact element associated with any entity identifier cluster.

17. The method of claim 16, the method further comprising:

receiving, by the database system, further entity data from the entity via a further department of the enterprise, the further entity data including a further identification element submitted by the entity for identifying the entity, and also including a further contact element submitted by the entity for contacting the entity, the further department of the enterprise being different from each of the department of the enterprise, the other department of the enterprise, and the additional department of the enterprise;

generating, by the database system, a further score for the further contact element, the further score being based on a further context associated with the further department of the enterprise and the further contact element; and storing, by the database system, a further entity identifier cluster comprising the further entity data and at least one of the entity data, the other entity data, and the additional entity data, in response to a determination that a match exists between the further contact element and one of the contact element, the other contact element, and the additional contact element.

* * * * *